US012732516B2

(12) United States Patent
Choi et al.

(10) Patent No.: US 12,732,516 B2
(45) Date of Patent: Sep. 8, 2026

(54) APPARATUS AND METHOD FOR ADVERSARIAL CAN PACKETIZATION FOR PHYSICAL ATTACK OF VEHICLE

(71) Applicant: Foundation of Soongsil University-Industry Cooperation, Seoul (KR)

(72) Inventors: Daeseon Choi, Daejeon (KR); Dowan Kim, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 104 days.

(21) Appl. No.: 18/749,769

(22) Filed: Jun. 21, 2024

(65) Prior Publication Data

US 2024/0340297 A1 Oct. 10, 2024

Related U.S. Application Data

(63) Continuation of application No. PCT/KR2022/020573, filed on Dec. 16, 2022.

(30) Foreign Application Priority Data

Dec. 21, 2021 (KR) ........................ 10-2021-0183730

(51) Int. Cl.
*H04L 9/40* (2022.01)

(52) U.S. Cl.
CPC ...... *H04L 63/1416* (2013.01); *H04L 63/1466* (2013.01)

(58) Field of Classification Search
CPC ... H04L 63/1416; H04L 63/1466; H04L 9/40; H04L 12/40; H04L 12/40084;
(Continued)

(56) References Cited

U.S. PATENT DOCUMENTS

2017/0286675 A1* 10/2017 Shin .................... H04L 63/1416
2020/0213351 A1 7/2020 Shin et al.
(Continued)

FOREIGN PATENT DOCUMENTS

CN 114157469 A * 3/2022 ............. G06N 3/045
KR 10-1714520 B1 3/2017
(Continued)

OTHER PUBLICATIONS

International Search Report of PCT/KR2022/020573, issued on Mar. 23, 2023.
(Continued)

*Primary Examiner* — Joe Chacko
(74) *Attorney, Agent, or Firm* — ZION IP; Byungwoong Park

(57) ABSTRACT

An apparatus and a method for an adversarial attack on vehicle's controller area network (CAN). The apparatus comprises: a data generation module for collecting a plurality of CAN messages, extracting preconfigured some data from the plurality of collected CAN messages, adding type information for the CAN messages to the extracted some data so as to generate CAN message packets, and gathering the generated CAN message packets so as to configure a CAN message packet data set; a pre-processing module for inserting noise into some CAN message packets of the CAN message packet data set, wherein the noise is inserted on the basis of the type information of each CAN message packet; and an adversarial attack generation module for receiving the CAN message packet having noise inserted thereinto so as to generate an adversarial CAN message that can evade an intrusion detection system (IDS) of the vehicle.

7 Claims, 10 Drawing Sheets

(58) Field of Classification Search
CPC ..... H04L 12/40104; H04L 2012/40215; H04L 2012/40273
See application file for complete search history.

(56) References Cited

U.S. PATENT DOCUMENTS

| | | | | |
|---|---|---|---|---|
| 2021/0218757 | A1 | 7/2021 | Bhonsle et al. | |
| 2022/0179990 | A1* | 6/2022 | Tran | G06N 3/094 |
| 2024/0232335 | A1* | 7/2024 | Jan | G06N 3/094 |

FOREIGN PATENT DOCUMENTS

| | | | |
|---|---|---|---|
| KR | 10-2018-0123557 | A | 11/2018 |
| KR | 10-2026455 | B1 | 9/2019 |
| KR | 10-2159136 | B1 | 9/2020 |
| KR | 10-2190054 | B1 | 12/2020 |
| KR | 10-2021-0131792 | A | 11/2021 |
| KR | 10-2021-0134635 | A | 11/2021 |

OTHER PUBLICATIONS

Dowan Kim et al. GAN based Adversarial CAN Frame Generation Method for Physical Attack Evading Intrusion Detection System. Feb. 2020.
Zilong Lin et al. IDSGAN: Generative Adversarial Networks for Attack Generation against Intrusion Detection. Jul. 18, 2019.
Eunbi Seo et al. GIDS: GAN based Intrusion Detection System for In-Vehicle Network.
Kwon, Hyun et al. Adversarial example technology trends for deep learning models. Apr. 30, 2021.

* cited by examiner

| SOF | Arbitration Field | Control Field | Data Field | CRC Field | ACK Field | EOF |
|---|---|---|---|---|---|---|

FIG. 2

APPARATUS AND METHOD FOR ADVERSARIAL CAN PACKETIZATION FOR PHYSICAL ATTACK OF VEHICLE

TECHNICAL FIELD

Embodiments of the present disclosure described herein relate to an adversarial attack technology for a CAN of a vehicle.

The present disclosure is derived from research conducted as part of challenge R&D overall task in the next-generation security field by Ministry of Science and ICT (Project No.: 1711126297, Project No.: 2021-0-00111-001, Research project name: research on autonomous vehicle cyber attack and defense technology using AI technology, project management institution: Information and Communication Planning and Evaluation Institute, task performing institution: Soongsil University Industry-Academic Cooperation Foundation, and research period: 2021 Jan. 1~2021 Dec. 31) and development of key source technologies for information protection (Project No.: 1711134508, Project No.: 2021-0-00511-001, Research project name: development of robust AI and distributed attack detection technology for edge AI security, project management institution: Information and Communication Planning and Evaluation Institute, task performing institution: Soongsil University Industry-Academic Cooperation Foundation, and research period: 2021 Apr. 1~2026 Dec. 31). Meanwhile, there is no property interest of the Korean government in any aspect of the inventive concept.

BACKGROUND ART

A vehicle may include a plurality of electronic control units (ECU) to control an electronic system in the vehicle. The ECU may control the vehicle using a controller area network (CAN) which is in-vehicle communication specifications. However, there is a problem in which the CAN is vulnerable to a CAN message hacking attack because it did not assume security threats at the time of development.

An intrusion detection system (IDS) technology has been introduced to detect such a hacking attack. Recently, with the development of artificial intelligence technology, machine learning-based IDS research has actively proceeded. However, despite showing high accuracy, there is a disadvantage in which the machine learning is vulnerable to an adversarial example attack. An adversarial example is an attack for adding very small noise to input data such that a classification value for the input data varies.

Thus, there is a need for a method capable of generating an adversarial example for an IDS of a vehicle to avoid the IDS and inserting the adversarial example into a real vehicle to make a physical attack. In other words, although the adversarial example capable of avoiding the IDS is generated, as the meaning of the attack itself is able to disappear because noise modulated when the adversarial example is inserted into the real vehicle is able to disappear and an arbitration ID or a data field is able to change to another value due to the modulation, there is a need for a method capable of inserting the adversarial example into the real vehicle and making the physical attack.

SUMMARY

Embodiments of the present disclosure provide an adversarial attack apparatus for generating an adversarial example capable of voiding an intrusion detection system (IDS) of a vehicle and an adversarial attack method.

Embodiments of the present disclosure provide an adversarial attack apparatus for inserting an adversarial example into a real vehicle and an adversarial attack method.

Meanwhile, the technical problems to be solved by the present disclosure are not limited to the aforementioned problems, and any other technical problems not mentioned herein will be clearly understood from the following description by those skilled in the art to which the present disclosure pertains.

According to an embodiment, an adversarial attack apparatus may include a data generation module that collects a plurality of controller area network (CAN) messages, extracts preset some piece of data from the collected plurality of CAN messages, adds type information about the CAN message to the extracted some pieces of data to generate a CAN message packet, and aggregates the generated CAN message packet to configure a CAN message packet dataset, a preprocessing module that inserts noise into some CAN message packets in the CAN message packet dataset, the noise being inserted based on the type information of each CAN message packet, and an adversarial attack generation module that receives the CAN message packet into which the noise is inserted and generates an adversarial CAN message capable of avoiding an intrusion detection system (IDS) of a vehicle.

The preprocessing module may include a data conversion unit that converts a data format of each CAN message packet of the CAN message packet dataset and a noise insertion unit that inserts the noise based on the type information of each CAN message packet.

The type information may include class information indicating whether the corresponding CAN message packet is a normal packet or an attack packet and subclass information indicating whether the corresponding CAN message packet is any type of attack among a flooding attack, a fuzzing attack, a relay attack, and a spoofing attack, when the corresponding CAN message packet is the attack packet.

The noise insertion unit may determine whether to insert the noise into the corresponding CAN message packet based on the class information in the type information and may determine whether to insert the noise into any portion of the CAN message packet based on an attack type according to the subclass information in the type information, when determining to insert the noise into the CAN message packet.

The preset some pieces of data may include an arbitration ID extracted from an arbitration field of the plurality of CAN messages, a data length code (DLC) extracted from a control field, and data extracted from a data field. The data generation module may generate statistical information about each CAN message packet based on the CAN message packet dataset and may include the generated statistical information in each CAN message packet.

The data conversion unit may convert the arbitration ID in the CAN message packet into a binary number by means of one-hot encoding, may convert the data in the CAN message packet from byte to bit, and may scale the statistical information in the CAN message packet to a value of a predetermined interval by means of a min-max scaler to perform data conversion.

The adversarial attack generation module may include a generator trained to receive the CAN message packet into which the noise is inserted and generate the adversarial CAN message, an IDS that receives the adversarial CAN message output by the generator and a normal CAN message packet in the CAN message packet dataset and labels the result of classifying the adversarial CAN message and the normal CAN message packet, and a discriminator trained to receive the adversarial CAN message output by the generator and the normal CAN message packet in the CAN message packet dataset and classify the adversarial CAN message and the normal CAN message packet as attack or normal based on the classified result labeled by the IDS.

The adversarial attack generation module may further include a re-packet unit that restores the adversarial CAN message output from the generator in the form of an original CAN message packet.

The re-packet unit may include a first re-packet unit that restores an arbitration ID and data in the adversarial CAN message in the form of an integer and a second re-packet unit that takes an inverse of the min-max scaler to restore the statistical information in the adversarial CAN message to a value of an original scale.

According to an embodiment, an adversarial attack method may include collecting, by a data generation module, a plurality of controller area network (CAN) messages, extracting, by the data generation module, preset some piece of data from the collected plurality of CAN messages, adding, by the data generation module, type information about the CAN message to the extracted some pieces of data to generate a CAN message packet, and aggregating, by the data generation module, the generated CAN message packet to configure a CAN message packet dataset, inserting, by a preprocessing module, noise into some CAN message packets in the CAN message packet dataset, the noise being inserted based on the type information of each CAN message packet, and receiving, by an adversarial attack generation module, the CAN message packet into which the noise is inserted and generating, by the adversarial attack generation module, an adversarial CAN message capable of avoiding an intrusion detection system (IDS) of a vehicle.

According to the disclosed embodiment, noise may be added to the CAN message packet to generate an adversarial CAN message by means of an artificial neural network, thus avoiding an intrusion detection system (IDS) of a vehicle. Furthermore, only some pieces of data unrelated to an attack function depending on an attack type in the CAN message packet may be extracted and modulated (noise is inserted), such that the meaning of an attack does not disappear although the adversarial CAN message is inserted into a real vehicle. Furthermore, the adversarial CAN message may be restored in the form of an original CAN message packet and may be inserted into the real vehicle, thus facilitating a physical attack for the real vehicle.

Meanwhile, the effects that are achieved through the present disclosure may not be limited to what has been particularly described herein, and other advantages not described herein may be more clearly understood from the following detailed description by persons skilled in the art.

BRIEF DESCRIPTION OF THE DRAWINGS

FIG. 2 is a drawing illustrating a frame structure of a CAN message;

DETAILED DESCRIPTION OF EXEMPLARY EMBODIMENTS

Figure 1:
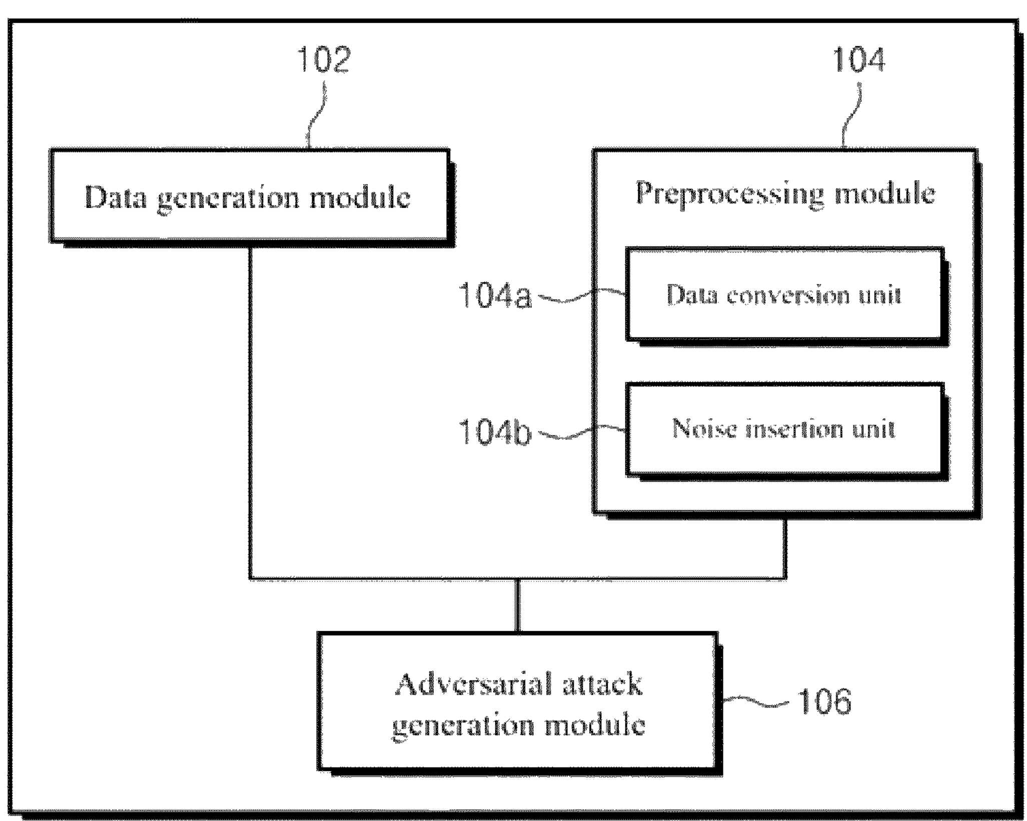
FIG. 1 is a block diagram illustrating a configuration of an adversarial attack apparatus for a controller area network (CAN) of a vehicle according to embodiment of the present disclosure.

Hereinafter, embodiments of the present disclosure will be described in detail with reference to the accompanying drawings. An embodiment of the present disclosure may be modified into several forms. It is not interpreted that the scope of the present disclosure is not limited to embodiments below. The embodiment is provided to describe the present disclosure more fully to those skilled in the art. Therefore, the shapes of the elements in the drawing may be exaggerated to emphasize more clear descriptions.

The configuration of the present disclosure for clarifying the solution to the problem to be solved by the present disclosure will be described in detail with reference to the accompanying drawings based on the embodiment of the present disclosure, and it should be noted in advance that in assigning reference numerals to the components of the drawings, the same reference numeral is assigned to the same component even though the component is included in a different drawing, and components of other drawings may be cited if necessary when the drawing is described.

FIG. 1 is a block diagram illustrating a configuration of an adversarial attack apparatus for a controller area network (CAN) of a vehicle according to embodiment of the present disclosure.

Referring to FIG. 1, an adversarial attack apparatus 100 may include a data generation module 102, a preprocessing module 104, and an adversarial attack generation module 106.

The module in the specification may refer to a functional and structural combination of hardware for performing the technical scope of the present disclosure and software for driving the hardware. For example, the "module" may refer to a logical unit of a certain code and a hardware resource for performing the certain code and does not necessarily refer to a physically connected code or does not necessarily refer to one type of hardware.

In an embodiment, the adversarial attack apparatus 100 may add noise to a controller area network (CAN) message packet for internal communication between electronic control units (ECUs) in a vehicle to generate an adversarial CAN message capable of avoiding an intrusion detection system (IDS) of the vehicle by means of an artificial neural network and may re-packet and inject the adversarial CAN message into a real vehicle, thus facilitating a physical attack.

The data generation module 102 may generate a CAN message packet dataset for an adversarial attack for a CAN of the vehicle. Furthermore, the data generation module 102 may generate statistical information about the CAN message packet dataset.

In detail, the data generation module 102 may collect a plurality of CAN messages. For example, the data generation module 102 may collect CAN messages used in several vehicles. At this time, the data generation module 102 may obtain a timestamp of each CAN message (or a time when the CAN message is logged). The data generation module 102 may extract information necessary for the adversarial attack from the collected CAN message.

Figure 2:
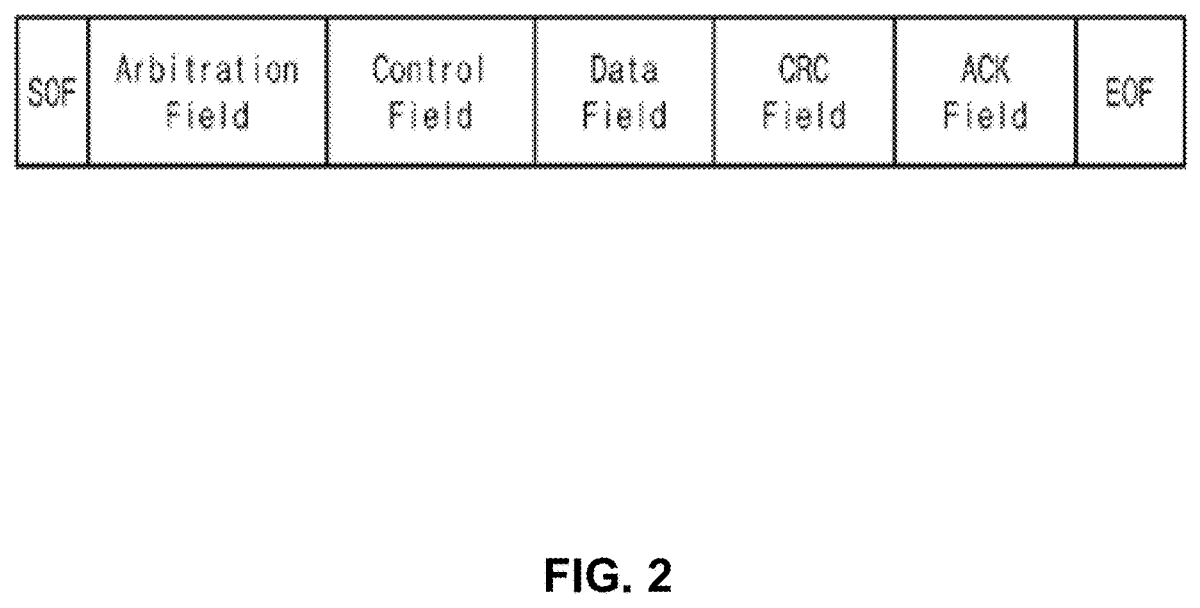

FIG. 2 is a drawing illustrating a frame structure of a CAN message.

Referring to FIG. 2, a start of frame (SOF) may indicate the beginning of the message, and an arbitration field may be composed of an 11-bit ID and a 1-bit remote transmission request (RTR). At this time, the ID may be used to specify a priority of the message and the RTR may be used to determine whether it is a remote frame or a data frame.

A control field may include a data length code (DLC) for providing a notification of a data length (or the number of bytes). A data field may be a portion in which actual information is stored, which may store data up to 8 bytes. A cyclic redundancy check (CRC) field may be used to check whether there is a message error. An acknowledgement (ACK) field may be used to verify whether there is an ACK bit in a transmission node and retransmit the ACK bit when there is no ACK bit. An end of frame (EOF) may serve to provide a notification of the end of the message.

Herein, a data generation module 102 may extract an ID in the arbitration field from a collected CAN message, may extract the data length code (DLC) in the control field, and may extract data of the data field. The data generation module 102 may add the information extracted from the CAN message, a timestamp of each CAN message, and type information about the corresponding CAN message to generate a CAN message packet.

Herein, the type information about the CAN message may include class information indicating whether the corresponding CAN message packet is a normal packet or an attack packet (i.e., a packet for an adversarial attack) and subclass information indicating whether the corresponding CAN message is any type of attack, when the corresponding CAN message is the attack. At this time, the attack type may be a flooding attack, a fuzzing attack, a relay attack, and a spoofing attack.

Figure 3:
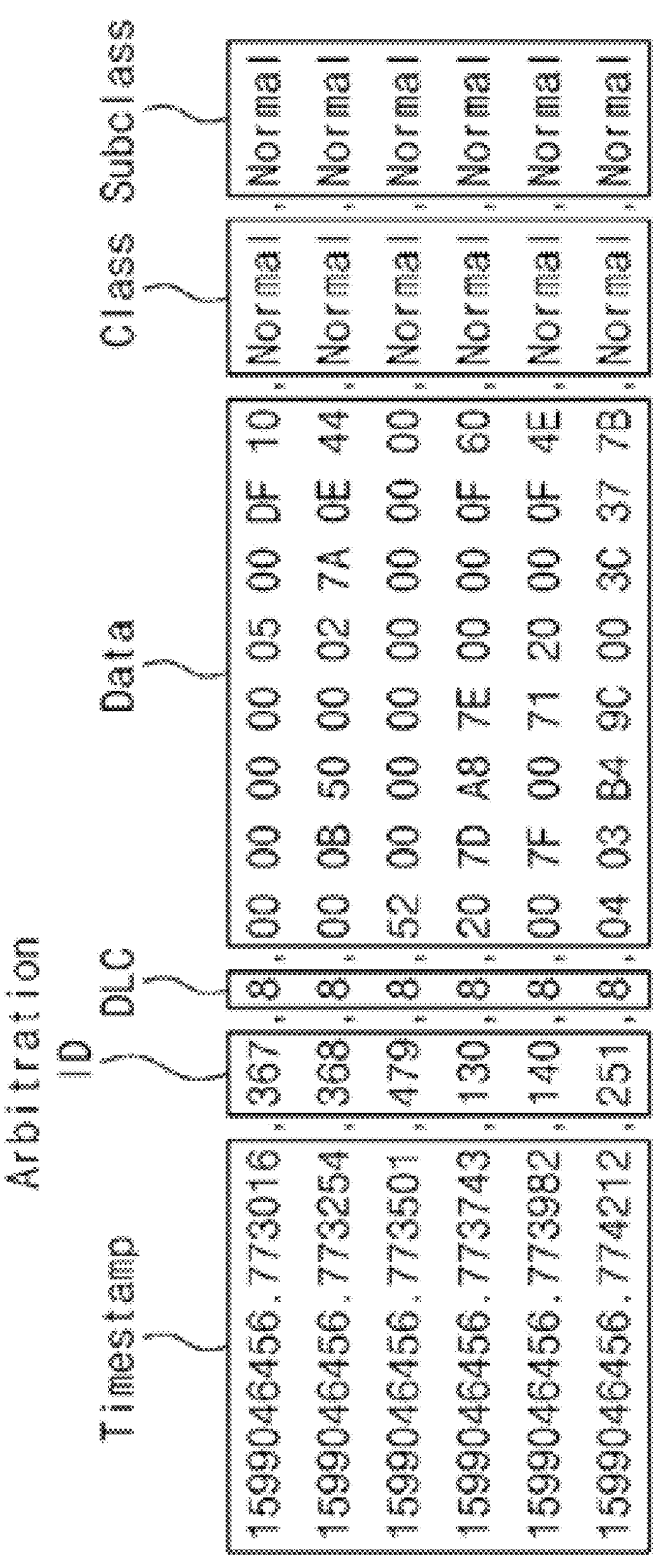
FIG. 3 is a drawing illustrating a CAN message packet dataset according to an embodiment of the present disclosure.

FIG. 3 is a drawing illustrating a CAN message packet dataset according to an embodiment of the present disclosure.

Referring to FIG. 3, each CAN message packet may be composed of a timestamp, an arbitration ID, a data length code (DLC), data (i.e., extracted from a data field), a class, and a subclass. The CAN message packet dataset may refer to a set of CAN message packets.

A data generation module 102 may generate statistical information about each CAN message packet based on the CAN message packet dataset. The data generation module 102 may include the statistical information in each CAN message packet. The data generation module 102 may deliver the CAN message packet dataset including the statistical information of each packet to a preprocessing module 104.

In an embodiment, the statistical information may include a time difference between a corresponding packet and a previous packet with the same arbitration ID as the corresponding packet in the CAN message packet dataset, a time difference between the corresponding packet and a previous packet with the same data as the corresponding packet, the number of packets with the same arbitration ID as the corresponding packet in the CAN message packet dataset, and the number of packets with the same data as the corresponding packet in the CAN message packet dataset.

Furthermore, the preprocessing module 104 may perform preprocessing the CAN message packet dataset. The preprocessing module 104 may include a data conversion unit 104*a* and a noise insertion unit 104*b*.

The data conversion unit 104*a* may convert each CAN message packet of the CAN message packet dataset into a form usable in an adversarial attack generation module 106. For example, the data conversion unit 104*a* may perform data conversion of the arbitration ID in the CAN message packet by means of one-hot encoding. In other words, the arbitration ID may consist of a hexadecimal number and the hexadecimal number may be converted into binary numbers 0 and 1 by means of the one-hot encoding. The one-hot encoding is a vector expression scheme for assigning a value of 1 to a specific index and assigning 0 to another index. The data conversion unit 104*a* may assign 1 to digits corresponding to an arbitration ID's number in the CAN message packet and may assign 0 to the remaining digits to convert it into a binary number.

The data conversion unit 104*a* may convert bytes of data into bits in the CAN message packet. In other words, the data in the CAN message packet may consist of 8 bytes, which may be converted into a binary number in the form of a bit to be converted into data of 64 (8 bytes=64 bits) "0" and "1".

Furthermore, the data conversion unit 104*a* may scale the statistical information to a value of a predetermined interval to perform data conversion. For example, the data conversion unit 104*a* may perform data conversion of the statistical information into a value between 0 and 1 by means of a min-max scaler. The data conversion unit 104*a* may scale the statistical information to a value between 0 and 1 by means of Equation 1 below.

$$\text{MinMax}(x) = \frac{x - \min(x)}{\max(x) - \min(x)} \quad \text{[Equation 1]}$$

x: each of pieces of statistical information min(x): the minimum value in the statistical information max(x): the maximum value in the statistical information The noise insertion unit 104*b* may insert noise based on type information of each CAN message packet in the CAN message packet dataset. Herein, the noise is inserted to generate an adversarial attack example for a CAN.

In detail, the noise insertion unit 104*b* may determine whether to insert noise into the corresponding CAN message packet based on class information in the type information of each CAN message packet. The noise insertion unit 104*b* may insert noise into the corresponding CAN message packet, when the class information in the type information of the CAN message packet is an "attack", and may fail to insert noise into the corresponding CAN message packet, when the class information in the type information of the CAN message packet is "normal". For example, the noise insertion unit 104*b* may insert noise between 0 and 1 into the CAN message packet, the class information of which is the attack.

Furthermore, when inserting the noise into the CAN message packet (i.e., when the class information is the "attack"), the noise insertion unit 104*b* may determine whether to insert noise into any portion of the CAN message packet based on subclass information in the type information of the CAN message packet. In other words, the noise insertion unit 104*b* may determine whether to insert noise into any portion of the CAN message packet depending to an attack type according to the subclass information.

In other words, although an adversarial CAN message is generated by means of an adversarial attack generation module 106, as the noise disappears when the adversarial CAN message is injected into a real vehicle, because the attack is able to become meaningless, a feature determined to be unrelated to a function of the adversarial attack in the CAN message packet may be selected and noise may be inserted.

In an embodiment, the noise insertion unit 104*b* may determine whether to insert noise into any portion of the CAN message packet depending on feature importance for an attack type included in the subclass information. Herein, the feature importance may indicate a degree to which each feature (e.g., an arbitration ID, data, each of pieces of statistical information, and the like) included in the CAN message packet contributes to a predicted result of a machine learning model used in an intrusion detection system (IDS) of a vehicle.

Figure 4:
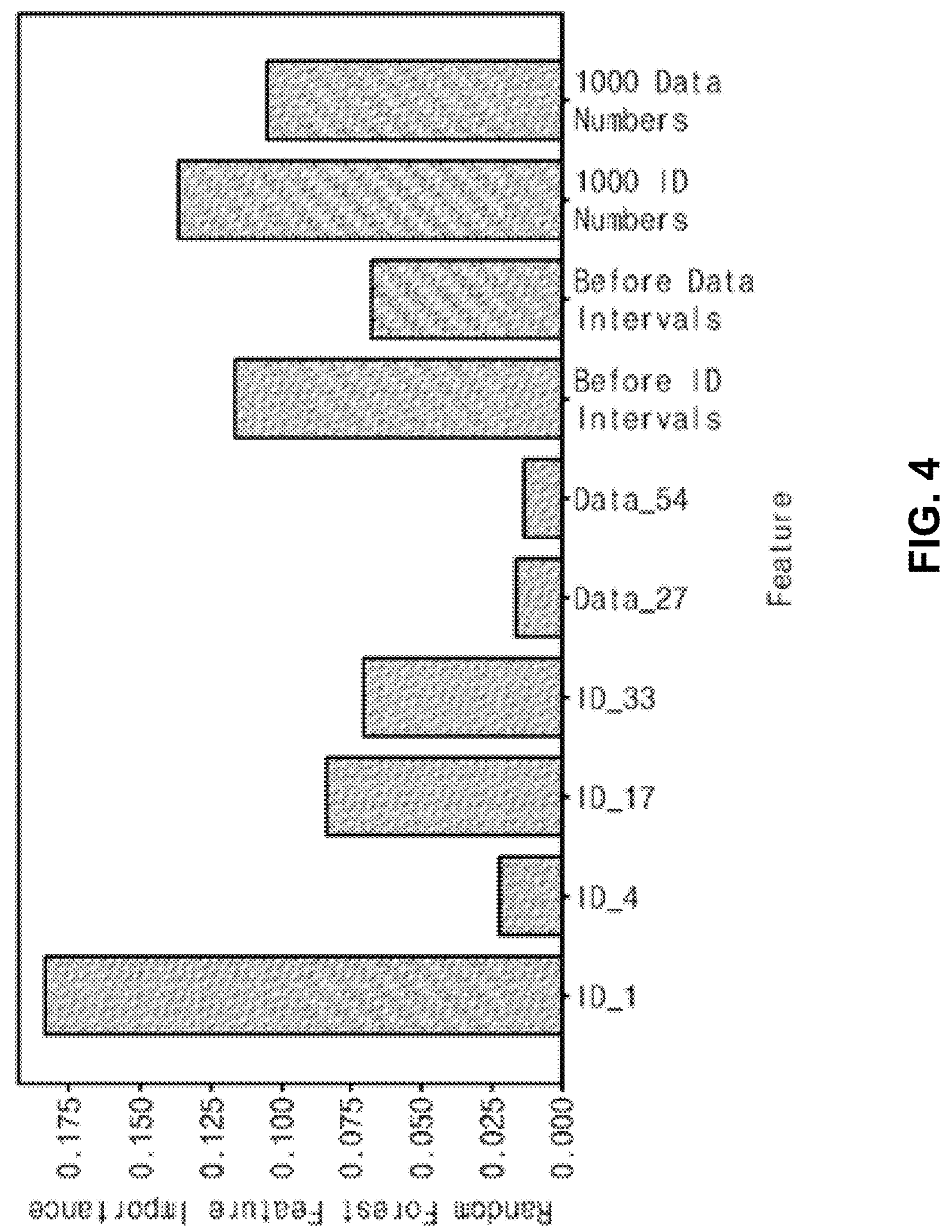
FIG. 4 is a graph illustrating feature importance according to a flooding attack in an embodiment of the present disclosure.

FIG. 4 is a graph illustrating feature importance according to a flooding attack in an embodiment of the present disclosure. Because the flooding attack is an attack for transmitting an arbitration ID with a high priority in bulk, the arbitration ID and statistical information among respective features indicate high feature importance. Herein, even if the statistical information is modulated (i.e., even if noise is inserted), because the meaning of an attack does not disappear, it is assumed that noise is inserted. Thus, when the attack type is the flooding attack, a noise insertion unit 104*b* may insert noise into data (i.e., data extracted from a data field) and the statistical information, except for the arbitration ID in a CAN message packet.

Figure 5:
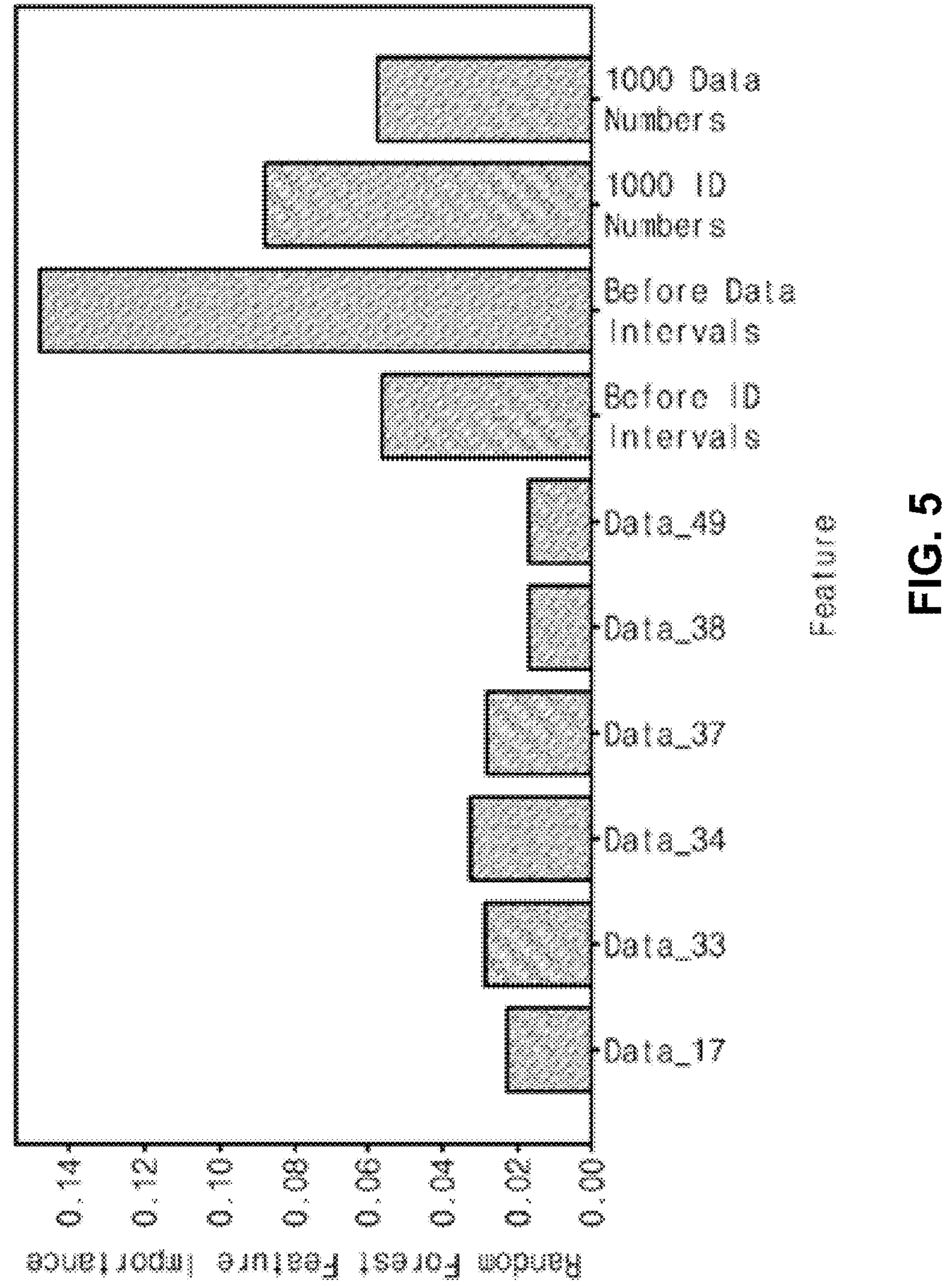
FIG. 5 is a graph illustrating feature importance according to a fuzzing attack in an embodiment of the present disclosure.

FIG. 5 is a graph illustrating feature importance according to a fuzzing attack in an embodiment of the present disclosure. Because the fuzzing attack is an attack for injecting random data into a randomly selected arbitration ID, data and statistical information among respective features indicate high feature importance. However, even if the data has the high feature importance, because the fuzzing attack injects random data to attack, the fuzzing attack does not change to another attack although the data is modulated. Thus, when the attack type is the fuzzing attack, a noise insertion unit 104*b* may insert noise into the data and the statistical information, except for the arbitration ID in a CAN message packet.

Figure 6:
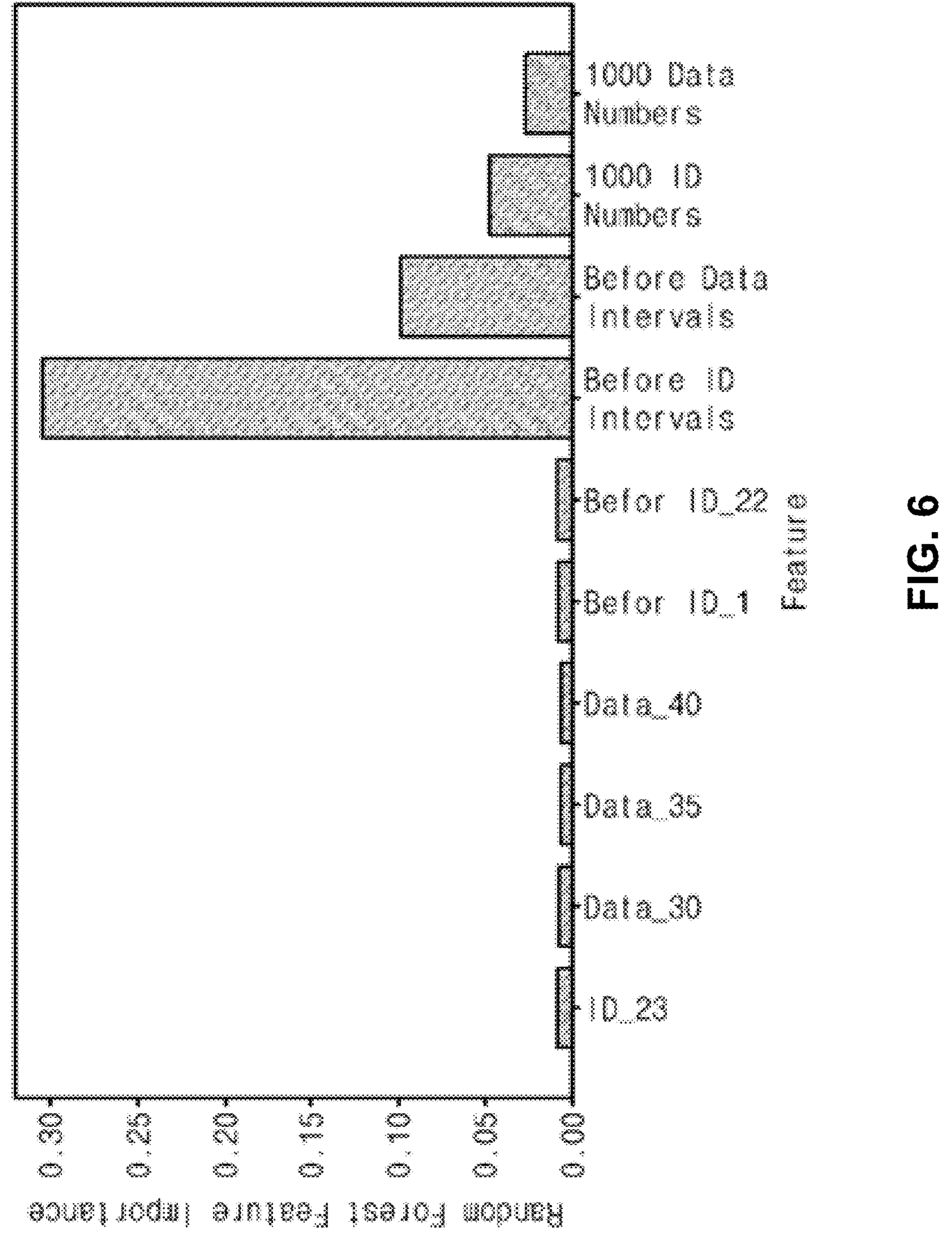
FIG. 6 is a graph illustrating feature importance according to a relay attack in an embodiment of the present disclosure.

FIG. 6 is a graph illustrating feature importance according to a relay attack in an embodiment of the present disclosure. The relay attack is an attack for extracting a normal CAN message packet during a certain time and injecting the CAN message packet again. Statistical information among respective features indicates high feature importance. Unlike the other attacks, the relay attack has the limitation that the meaning of the relay attack may disappear, when an arbitration ID and data are modulated. When the attack type is the relay attack, a noise insertion unit 104*b* may insert noise into only statistical information in a CAN message packet.

Figure 7:
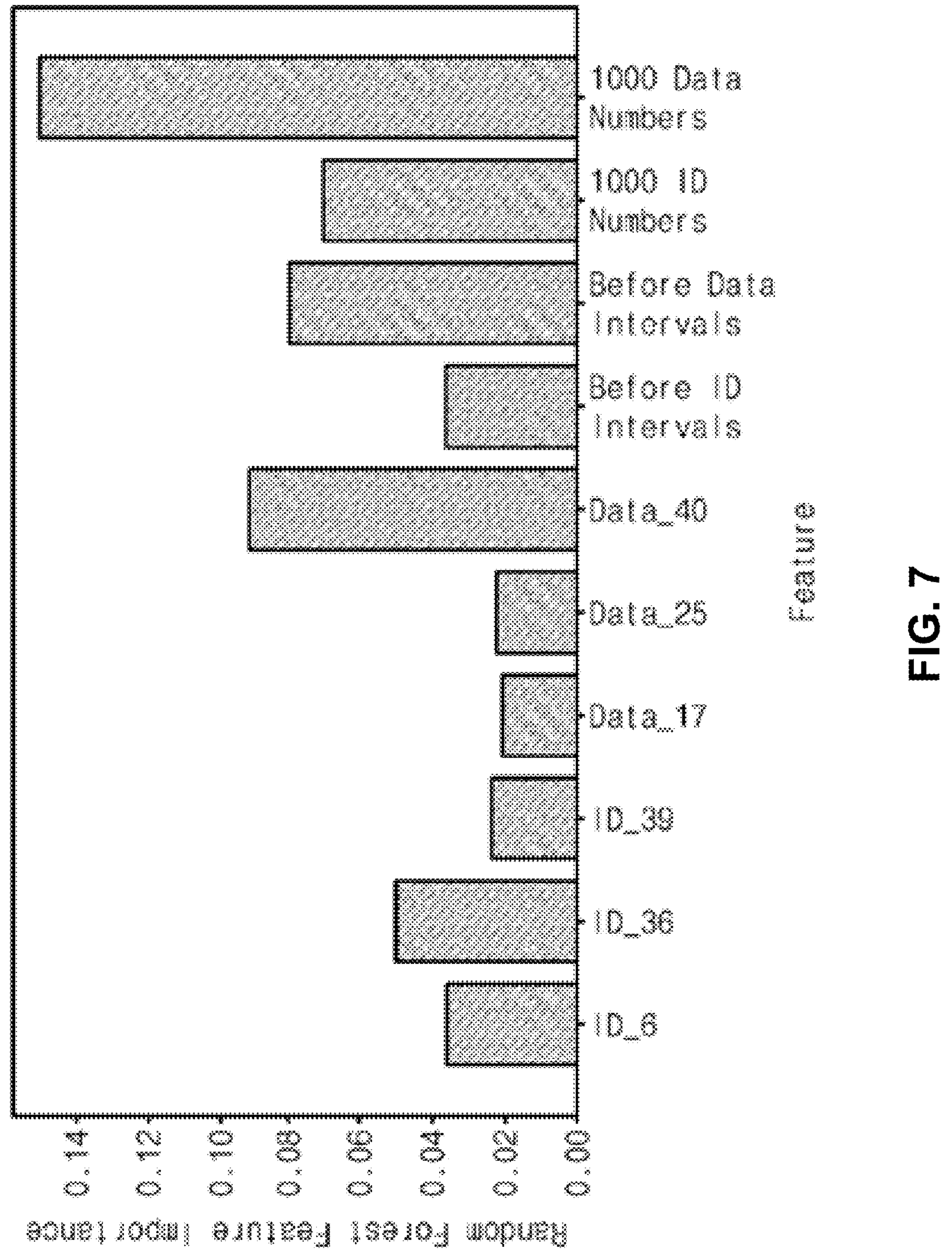
FIG. 7 is a graph illustrating feature importance according to a spoofing attack in an embodiment of the present disclosure.

FIG. 7 is a graph illustrating feature importance according to a spoofing attack in an embodiment of the present disclosure. The spoofing attack is an attack for manipulating and injecting data such that a desired attack is able to occur in an arbitration ID randomly selected by an attacker. Various features, such as an arbitration ID, data, and statistical information, among respective features indicate high feature importance. When the attack type is the spoofing attack, a noise insertion unit 104*b* may insert noise into the data and the statistical information, except for the arbitration ID in a CAN message packet. However, because the function of an attack desired by the attacker is unable to occur when noise is inserted into all of data, only the remaining portion except for a portion with an attack function among 8 bytes of the data may be selected and noise may be inserted.

As such, whether to insert noise into any portion of the CAN message packet may be determined depending on feature importance for an attack type included in subclass information, thus preventing the meaning of an attack from disappearing when an adversarial attack example is generated and inserted into a real vehicle, such that an attack desired by the attacker is able to occur.

An adversarial attack generation module 106 may receive a feature into which noise is inserted in a CAN message from a preprocessing module 104 to generate an adversarial CAN feature and may combine it with an original CAN feature into which noise is not inserted to generate an adversarial CAN message.

Figure 8:
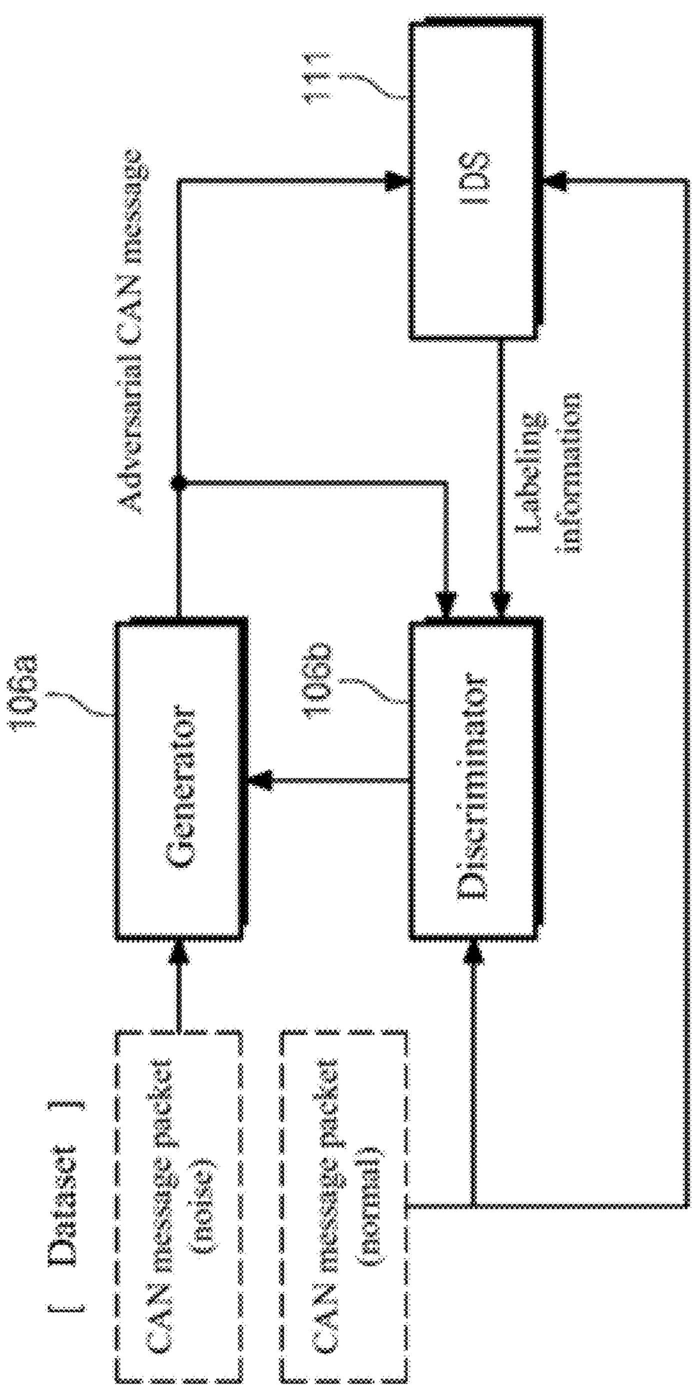
FIG. 8 is a drawing illustrating a configuration of an adversarial attack generation module according to an embodiment of the present disclosure.

FIG. 8 is a drawing illustrating a configuration of an adversarial attack generation module 106 according to an embodiment of the present disclosure.

Referring to FIG. 8, the adversarial attack generation module 106 may include a generator 106*a* and a discriminator 106*b*. The adversarial attack generation module 106 may be a generative adversarial network, which may include the generator 106*a* and the discriminator 106*b*.

The generator 106*a* may be an artificial neural network trained to receive a CAN message packet into which noise is inserted and generate an adversarial CAN message. For example, the generator 106*a* may have a 5-layer neural network structure and may use an ReLU activation function in each layer, but the neural network structure is not limited thereto. Herein, the adversarial CAN message appears to be a normal CAN message packet, but actually includes noise, which is to avoid an IDS 111 to make an adversarial attack.

Herein, the adversarial CAN message output by the generator 106*a* may be input to the intrusion detection system (IDS) 111. Furthermore, a normal CAN message packet in a CAN message packet dataset may be input to the IDS 111. The IDS 111 may classify whether the input adversarial CAN message and the normal CAN message packet are attack or normal (i.e., a message for an attack or a normal message). The IDS 111 may label the result of classifying the input adversarial CAN message and the normal CAN message packet.

At this time, the IDS 111 may have a high probability that the normal CAN message packet will be classified as normal and the adversarial CAN message will be classified as attack at the beginning of learning, but will be classified as normal as learning proceeds (i.e., as the generator 106*a* generates an adversarial CAN message more similar to the normal CAN message packet). The IDS 111 may deliver the labeled classified result to the discriminator 106*b*.

The discriminator 106*b* may receive the adversarial CAN message output by the generator 106*a* and the normal CAN message packet in the CAN message packet dataset. The discriminator 106*b* may be an artificial neural network trained to classify the adversarial CAN message and the normal CAN message packet as attack or normal by using the labeled classified result delivered from the IDS 111 as the ground truth. For example, the discriminator 106*b* may be composed of a 5-layer neural network and each layer may use a LeakyReLU activation function. The neural network structure is not limited thereto.

Herein, a loss function $L_D$ of the discriminator 106*b* may be represented as Equation 2 below. The discriminator 106*b* may be trained such that the loss function $L_D$ below is minimized.

$$L_D = E_{S \in B_{normal}} D(S) - E_{S \in B_{attack}} D(S) \quad \text{[Equation 2]}$$

S: the adversarial CAN message and the normal CAN message packet, which are input to the discriminator 106*b*

D: the artificial neural network constituting the discriminator 106*b*.

$E_{S \in B_{normal}}$: the average probability value classified as normal by the IDS 111 in the training dataset $E_{S \in B_{attack}}$: the average probability value classified as attack by the IDS 111 in the training dataset Furthermore, a loss function $L_G$ of the generator 106*a* may be represented as Equation 3 below. The generator 106*a* may be trained such that the loss function $L_G$ below is minimized.

$$L_G = E_{M \in S_{attack}, N} D(G(M, N)) \quad \text{[Equation 3]}$$

M: the CAN message packet into which noise is inserted.

N: noise

G: the artificial neural network constituting the generator 106*a*.

D: the artificial neural network constituting the discriminator 106*b*.

Based on Equation 1 and Equation 2, the generator 106*a* may be trained such that a difference between being classified as normal by the discriminator 106*b* and being classified as attack by the discriminator 106*b* is minimized. In other words, the generator 106*a* may be trained such that the adversarial CAN message output by the generator 106*a* is classified as normal as possible rather than attack by the IDS 111.

Meanwhile, because the adversarial CAN message output by the generator 106*a* is data in the form of a real number including noise (e.g., a value between 0 and 1), when the adversarial CAN message output by the generator 106*a* is injected into a vehicle as it is, noise may disappear. As the modulated meaning disappears or there is another attack rather than an original attack, the meaning of the original attack may vary.

In the disclosed embodiment, the adversarial CAN message output by the generator 106*a* may be restored in the form of an original CAN message packet to be inserted into the vehicle.

Figure 9:
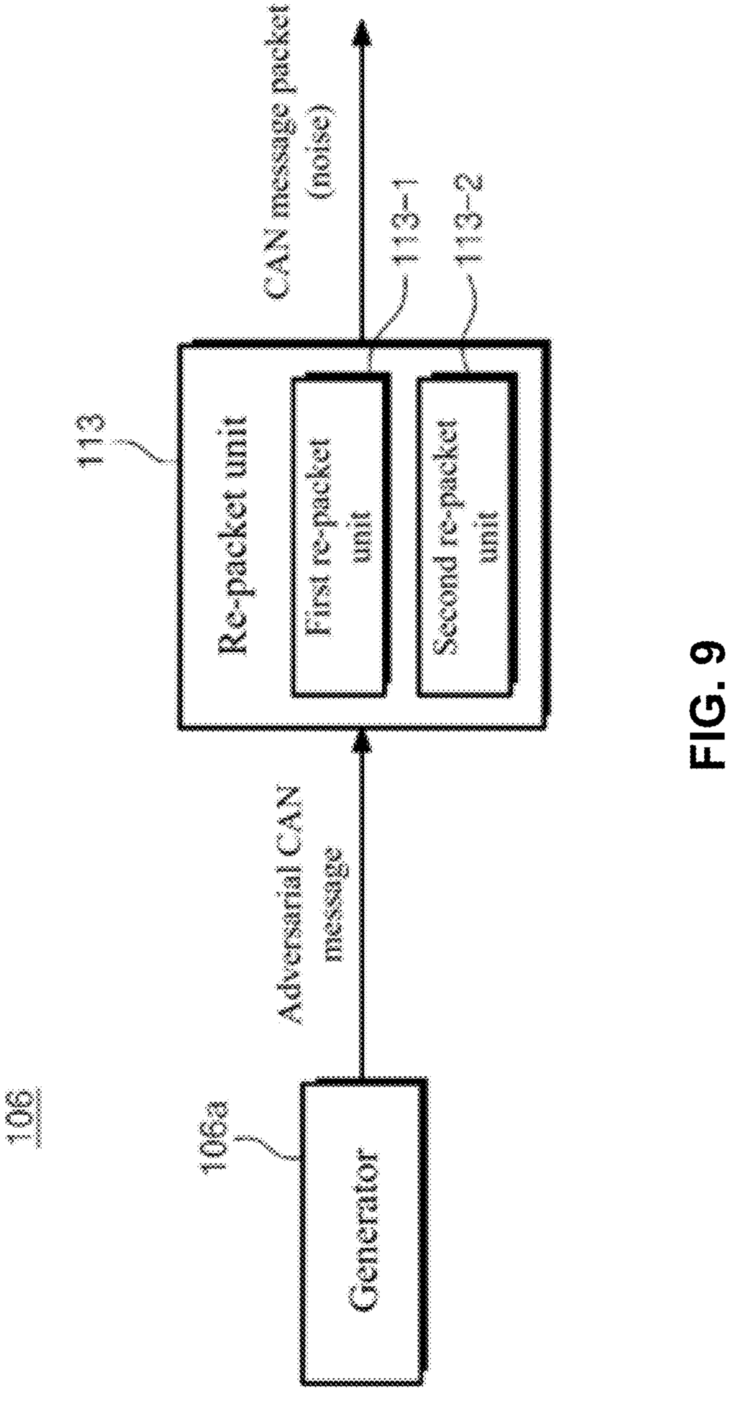
FIG. 9 is a drawing illustrating a configuration of an adversarial attack generation module 106 according to another embodiment of the present disclosure.

FIG. 9 is a drawing illustrating a configuration of an adversarial attack generation module 106 according to another embodiment of the present disclosure. Herein, only a configuration necessary to restore an adversarial CAN message in the form of an original CAN message packet is illustrated for convenience of description. Referring to FIG. 9, the adversarial attack generation module 106 may further include a re-packet unit 113.

The re-packet unit 113 may restore an adversarial CAN message output by a generator 106*a* in the form of an original CAN message packet. The re-packet unit 113 may include a first re-packet unit 113-1 and a second re-packet unit 113-2.

The first re-packet unit 113-1 may restore an arbitration ID and data in an adversarial CAN message in the form of an integer. For example, the first re-packet unit 113-1 may restore the arbitration ID and the data in the adversarial CAN message to the form of the integer by means of Equation 4 below.

$$0 < x \leq 1, [x] \quad \text{[Equation 4]}$$

x: the arbitration ID and data value

[x]: the rounding function

In other words, because the arbitration ID in the CAN message packet before being input to an adversarial attack generation module 106 is expressed by means of one-hot encoding and the data is expressed as bits of 0 and 1, the arbitration ID and the data in the form of a real number may be restored in the form of an integer of 0 and 1 by means of Equation 4 above.

The second re-packet unit 113-2 may restore statistical information in the adversarial CAN message to an original value. In other words, because the statistical information in the CAN message packet before being input to the adversarial attack generation module 106 is converted into a value between 0 and 1 by means of a min-max scaler, it may be restored to a value of an original scale.

The second re-packet unit 113-2 may restore the statistical information in the adversarial CAN message to the value of the original scale. In other words, the second re-packet unit 113-2 may take an inverse of the min-max scaler to restore the statistical information to the value of the original scale.

$$\text{MinMaxInverse}(x) = \text{MinMax}(x) \cdot (\text{Max}(x) - \text{Min}(x)) + \text{Min}(x) \quad \text{[Equation 5]}$$

Meanwhile, when the statistical information is restored to the value of the original scale, the value of the restored statistical information may fail to be identical to an original value. For example, a time difference between a corresponding packet and a previous packet with the same arbitration ID as the adversarial CAN message or the number of packets with the same arbitration ID as the adversarial CAN message may fail to be identical.

Thus, an adversarial attack apparatus 100 may obtain an average of respective pieces of statistical information of a CAN message packet, a class of which is "normal", with the same arbitration ID as a CAN message packet, a class of which is "attack", in a CAN message packet dataset (an average of pieces of statistical information of a normal packet) and may allow the statistical information of the adversarial CAN message output by the generator 106*a* to converge to the average of the pieces of statistical information of the normal packet, thus overcoming that the value of the statistical information is not identical upon the restoration.

According to the disclosed embodiment, noise may be added to the CAN message packet to generate an adversarial CAN message by means of an artificial neural network, thus avoiding an intrusion detection system (IDS) of a vehicle. Furthermore, only some pieces of data unrelated to an attack function may be extracted and modulated (noise is inserted) depending on an attack type in the CAN message packet, such that the meaning of an attack does not disappear even if the adversarial CAN message is inserted into a real vehicle. Furthermore, the adversarial CAN message may be restored in the form of an original CAN message packet and may be inserted into the real vehicle, thus facilitating a physical attack for the real vehicle.

Figure 10:
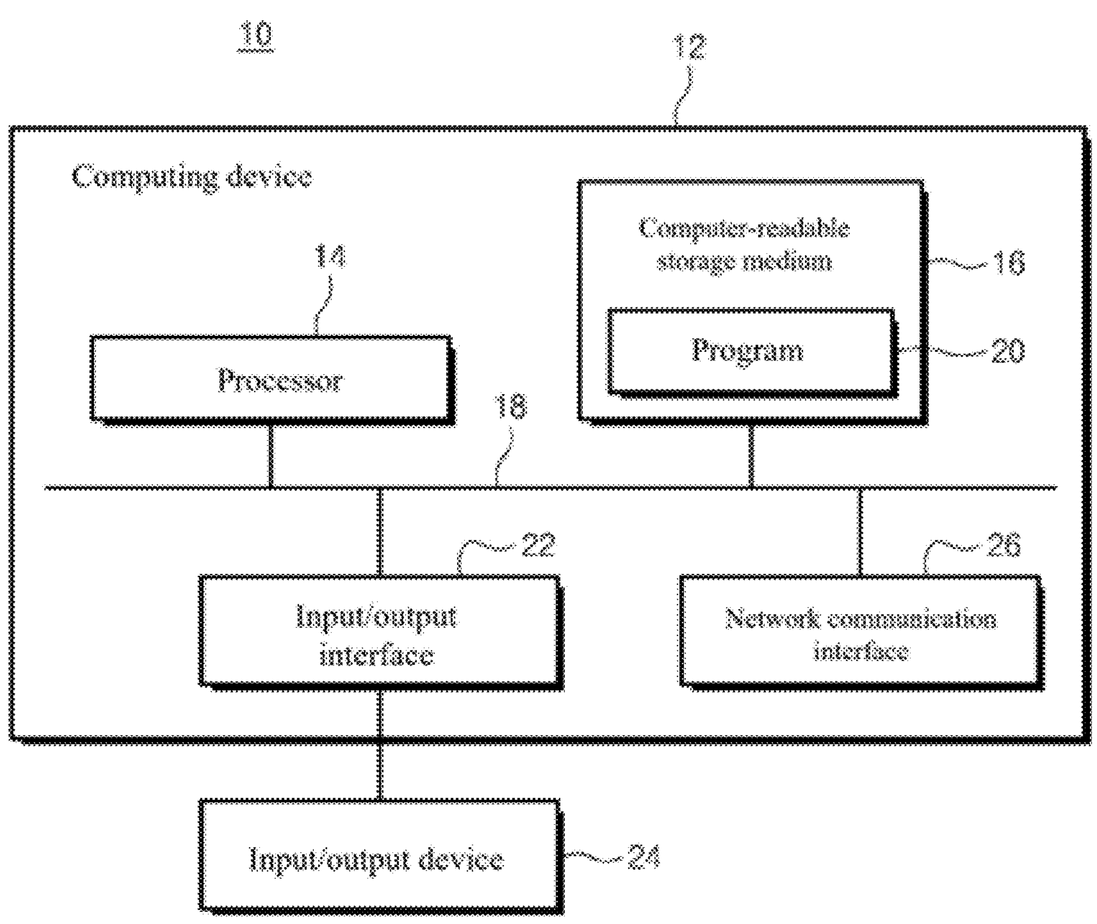
FIG. 10 is a block diagram for exemplifying and describing a computing environment including a computing device suitable for use in embodiments.

FIG. 10 is a block diagram for exemplifying and describing a computing environment 10 including a computing device suitable for use in embodiments. In the shown embodiment, each component may have a different function and capability from that described below, and may include an additional component other than that described below.

The shown computing environment 10 may include a computing device 12. In an embodiment, the computing device 12 may be an adversarial attack apparatus 100.

The computing device 12 may include at least one processor 14, a computer-readable storage medium 16, and a communication bus 18. The processor 14 may cause the computing device 12 to operate according to the embodiment described above. For example, the processor 14 may execute one or more programs stored in the computer-readable storage medium 16. The one or more programs may include one or more computer-executable instructions, and the computer-executable instructions may be configured to, when executed by the processor 14, cause the computing device 12 to perform operations according to an embodiment.

The computer-readable storage medium 16 may be configured to store computer-executable instructions, a computer-executable program code, program data, and/or another suitable type of information. A program 20 stored in the computer-readable storage medium 16 may include a set of instructions executable by the processor 14. In an embodiment, the computer-readable storage medium 16 may be a memory (a volatile memory such as a random access memory (RAM), a non-volatile memory, or a suitable combination thereof), one or more magnetic disc storage devices, optical disc storage devices, flash memory devices, other types of storage media capable of being accessed by the computing device 12 and storing desired information, or a suitable combination thereof.

The communication bus 18 may interconnect various other components of the computing device 12, including the processor 14 and the computer-readable storage medium 16.

Furthermore, the computing device 12 may include one or more input/output interfaces 22 for providing an interface for one or more input/output devices 24 and one or more network communication interfaces 26. The input/output interface 22 and the network communication interface 26 may be connected with the communication bus 18. The input/output device 24 may be connected with other components of the computing device 12 through the input/output interface 22. The input/output device 24 may include an input device, such as a pointing device (a mouse, a track pad, or the like), a keyboard, a touch input device (a touch pad, a touch screen, or the like), a voice or sound input device, various types of sensor devices, and/or an image capture device, and/or an output device, such as a display device, a printer, a speaker, and/or a network card. The input/output device 24 may be one component constituting the computing device 12 to be included in the computing device 12 and may be a separate device independent of the computing device 12 to be connected with the computing device 12.

The above detailed description exemplifies the present disclosure. Furthermore, the above-mentioned details represent and describe a preferable implementation form of the present disclosure. The present disclosure may be used in various other combinations, changes, and environments. In other words, the present disclosure may be changed or modified within the scope of the concept of the present disclosure disclosed in the specification, the scope equivalent to the stated disclosure details, and/or the scope of the technology or knowledge of an ordinary skilled person in the art. The stated embodiment describes the best state for implementing the technical scope of the present disclosure and facilitates various modifications required in a detailed application field and purpose of the present disclosure. Accordingly, the above detailed description of the present disclosure does not intend to limit the present disclosure to the disclosed implementation form. Furthermore, it should be construed that the accompanying claims may include other implementation form.

The invention claimed is:

1. An adversarial attack apparatus, comprising: at least one hardware processor; and a non-transitory computer-readable storage medium storing instructions which, when executed by the at least one hardware processor, are configured to implement:

a data generation module configured to collect a plurality of controller area network (CAN) messages, extract preset some piece of data from the collected plurality of CAN messages, add type information about the CAN message to the extracted some pieces of data to generate a CAN message packet, and aggregate the generated CAN message packet to configure a CAN message packet dataset;

a preprocessing module configured to insert noise into some CAN message packets in the CAN message packet dataset, the noise being inserted based on the type information of each CAN message packet; and an adversarial attack generation module configured to receive the CAN message packet into which the noise is inserted and generate an adversarial CAN message capable of avoiding an intrusion detection system (IDS) of a vehicle, wherein the preprocessing module includes:

converting a data format of each CAN message packet of the CAN message packet dataset; and a noise insertion unit configured to insert the noise based on the type information of each CAN message packet, wherein the type information includes class information indicating whether the corresponding CAN message packet is a normal packet or an attack packet and subclass information indicating whether the corresponding CAN message packet is any type of attack among a flooding attack, a fuzzing attack, a relay attack, and a spoofing attack, when the corresponding CAN message packet is the attack packet, wherein the noise insertion unit determines whether to insert the noise into the corresponding CAN message packet based on the class information in the type information and determines whether to insert the noise into any portion of the CAN message packet based on an attack type according to the subclass information in the type information, when determining to insert the noise into the CAN message packet.

2. The adversarial attack apparatus of claim 1, wherein the preset some pieces of data include an arbitration ID extracted from an arbitration field of the plurality of CAN messages, a data length code (DLC) extracted from a control field, and data extracted from a data field, and wherein the data generation module generates statistical information about each CAN message packet based on the CAN message packet dataset and includes the generated statistical information in each CAN message packet.

3. The adversarial attack apparatus of claim 2, wherein the data conversion unit converts the arbitration ID in the CAN message packet into a binary number by means of one-hot encoding, converts the data in the CAN message packet from byte to bit, and scale the statistical information in the CAN message packet to a value of a predetermined interval by means of a min-max scaler to perform data conversion.

4. The adversarial attack apparatus of claim 3, wherein the adversarial attack generation module includes:

a generator trained to receive the CAN message packet into which the noise is inserted and generate the adversarial CAN message;

an IDS configured to receive the adversarial CAN message output by the generator and a normal CAN message packet in the CAN message packet dataset and label the result of classifying the adversarial CAN message and the normal CAN message packet; and a discriminator trained to receive the adversarial CAN message output by the generator and the normal CAN message packet in the CAN message packet dataset and classify the adversarial CAN message and the normal CAN message packet as attack or normal based on the classified result labeled by the IDS.

5. The adversarial attack apparatus of claim 4, wherein the adversarial attack generation module further includes:

a re-packet unit configured to restore the adversarial CAN message output from the generator in the form of an original CAN message packet.

6. The adversarial attack apparatus of claim 5, wherein the re-packet unit includes:

a first re-packet unit configured to restore an arbitration ID and data in the adversarial CAN message in the form of an integer; and a second re-packet unit configured to take an inverse of the min-max scaler to restore the statistical information in the adversarial CAN message to a value of an original scale.

7. An adversarial attack method, comprising:

collecting, by a data generation module, a plurality of controller area network (CAN) messages, extracting, by the data generation module, preset some piece of data from the collected plurality of CAN messages, adding, by the data generation module, type information about the CAN message to the extracted some pieces of data to generate a CAN message packet, and aggregating, by the data generation module, the generated CAN message packet to configure a CAN message packet dataset;

inserting, by a preprocessing module, noise into some CAN message packets in the CAN message packet dataset, the noise being inserted based on the type information of each CAN message packet; and receiving, by an adversarial attack generation module, the CAN message packet into which the noise is inserted and generating, by the adversarial attack generation module, an adversarial CAN message capable of avoiding an intrusion detection system (IDS) of a vehicle, wherein the preprocessing module includes:

a data conversion unit configured to convert a data format of each CAN message packet of the CAN message packet dataset; and a noise insertion unit configured to insert the noise based on the type information of each CAN message packet, wherein the type information includes class information indicating whether the corresponding CAN message packet is a normal packet or an attack packet and subclass information indicating whether the corresponding CAN message packet is any type of attack among a flooding attack, a fuzzing attack, a relay attack, and a spoofing attack, when the corresponding CAN message packet is the attack packet, wherein the noise insertion unit determines whether to insert the noise into the corresponding CAN message packet based on the class information in the type information and determines whether to insert the noise into any portion of the CAN message packet based on an attack type according to the subclass information in the type information, when determining to insert the noise into the CAN message packet.

* * * * *